Patented Nov. 21, 1939

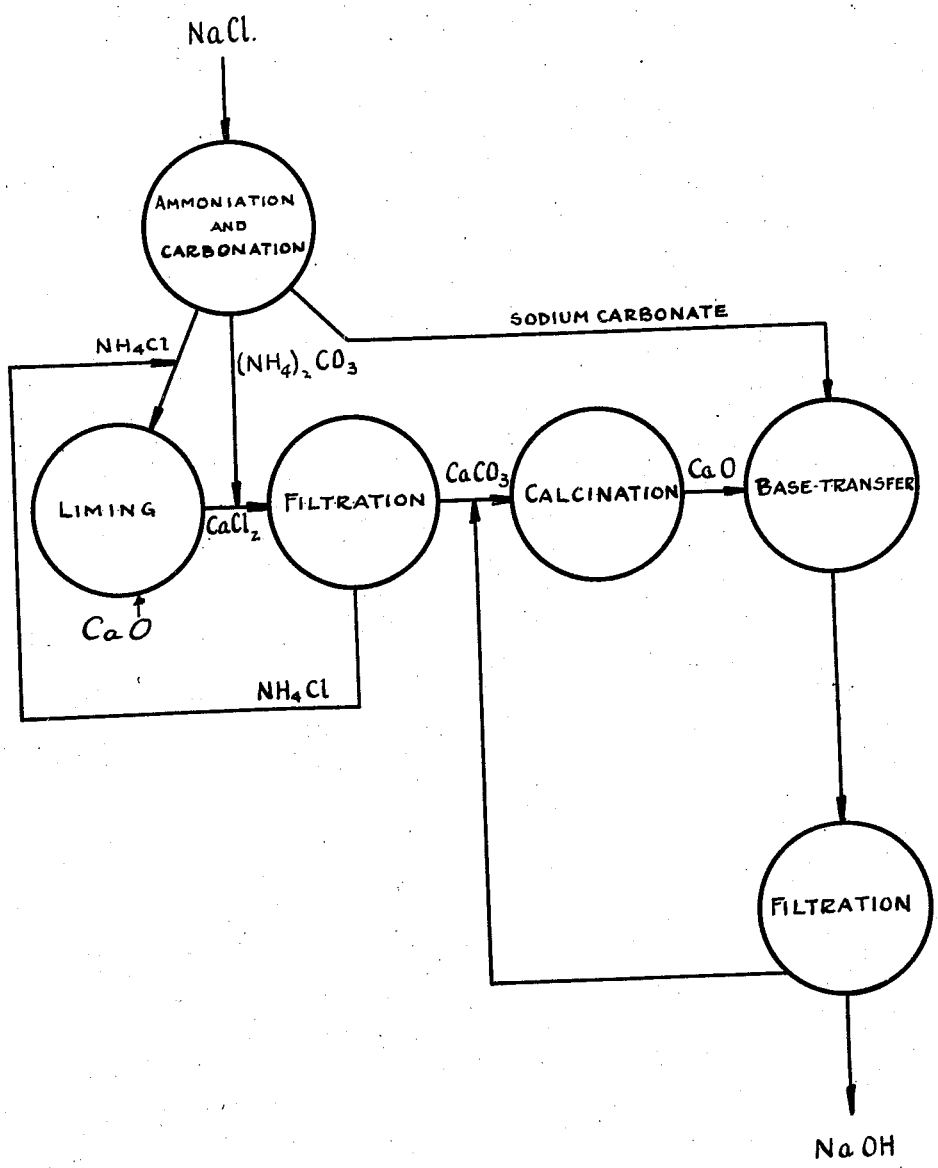

2,180,755

UNITED STATES PATENT OFFICE 2,180,755

PRODUCTION OF A PURE CAUSTIC SODA IN CONJUNCTION WITH THE AMMONIA-SODA PROCESS

John C. Garrels and Howard Roderick, Grosse Ile, Mich., assignors to Michigan Alkali Company, Wyandotte, Mich., a corporation of Michigan Application September 3, 1935, Serial No. 38,962

8 Claims. (Cl. 23—185)

The preparation of highly pure caustic soda involves considerable difficulty. Such a product particularly should be free from $SiO_2$, $Al_2O_3$, $Fe_2O_3$, and manganese oxides. In manufacturing caustic soda by reacting upon soda ash with lime prepared as usual from limestone, impurities of the character noted are carried into the caustic liquors by reason of their solubility in solutions of caustic soda. By various treatments, certain of the impurities can be removed, but there has been no simple and satisfactory method of eliminating all, and the production of highly purified caustic soda has remained more an expensive semi-laboratory specialty than a reasonable plant production process. We have now found, however, that in the operation of the ammonia-soda process for production of sodium carbonate, there are certain heretofore unrecognized and unused characteristics of materials in transit and certain stages which can be directed for the additional end of obviating impurities and attaining highly pure caustic soda besides the usual output of sodium bicarbonate or carbonate.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

The annexed drawing is a diagrammatic flow sheet illustrating the essential steps of the process.

In the practice of the ammonia-soda process, sodium chloride brine is treated with ammonia and carbon dioxide, along usual lines, and the sodium bicarbonate filtered from the ammonium chloride liquor which in turn is treated with CaO and steam to recover the ammonia, leaving a calcium chloride brine. In the ammoniation and carbonation of sodium chloride brine, compounds of carbonic acid are formed, and at stages ammonium bicarbonate, ammonium carbonate, sodium bicarbonate, and sodium carbonate are available. The calcium chloride waste product brine above-mentioned is now reacted with such a compound of carbonic acid formed in connection with the process, and a peculiarity of a calcium chloride brine of such concentration is that, although affording reactivity for the carbonic acid compound, it offers substantially no solubility for other contaminating matters. The calcium carbonate which is thus precipitated comes out with avoidance of materials which would ultimately contaminate the end product, and such calcium carbonate is calcined and is reacted with sodium carbonate from the process, in the presence of water, to form caustic soda and this caustic soda on separation from the calcium carbonate, and suitable concentration, presents a particularly high state of purity. For the compound of carbonic acid to react upon the calcium chloride brine, as noted, the $(NH_4)_2CO_3$ is particularly advantageous as available in the ammonia-soda operation, although $NH_4HCO_3$ or a mixture, or the sodium bicarbonate or final sodium carbonate may be used. Thus, ammonium carbonate or bicarbonate, intermediate products in such process, are bled off from the system and made to react with the hitherto waste calcium chloride liquor, and with the formation of the $CaCO_3$ which is used for causticizing the sodium carbonate; and the ammonium chloride solution or filtrate remaining from the separation of such $CaCO_3$ is turned back with the other ammonium chloride in the process, to be stript of the ammonia in the ammonia recovery still. In the treatment of the $CaCO_3$ for the calcining, and the causticizing of the sodium carbonate for the final caustic soda, usual or preferred means of calcining and handling, such as rotary kilns, etc., may be employed.

As an example: Sodium chloride brine having been treated with ammonia and carbon dioxide to the formation of sodium bicarbonate and ammonium chloride, and the sodium bicarbonate having been filtered off, is treated with $Ca(OH)_2$ and steam, recovering the ammonia back to the cycle, and leaving calcium chloride waste brine of solution; the latter is clarified, by settling to remove suspended matters, or filtering as desired, whereupon there is added to the brine a solution of ammonium carbonate or ammonium bicarbonate bled off from the ammonia and carbon dioxide recovery stage of the ammonia-soda operation. Sufficient ammonium carbonate or bicarbonate, or both, is added, to be in excess of the theoretical amount required to react with the calcium chloride, thus eliminating the return of liquors to the heater section of the ammonia still, containing calcium. The solution resulting, and now containing $CaCO_3$ in suspension and $NH_4Cl$ in solution, is filtered, and the filtrate is returned to the ammonia still, where the ammonia is recovered and put back into the ammonia-soda cycle. The filtered $CaCO_3$ is then washed free of chlorides and dried to any desired water content, and is put through a rotary kiln. The calcined product thereof is mixed with soda ash, or a decomposed sodium bicarbonate solution, coming from the final stage of the ammonia-soda process, and a solution of caustic soda with calcium carbonate in suspension results. The calcium carbonate is filtered out and after washing free of soda compounds is dried, passed through the rotary kiln, and returned to the cycle. The caustic soda filtrate solution is turned into the evaporators and concentrated to final form.

As another example: In the cycle as foregoing, the waste calcium chloride liquor is settled, and filtered if desired, and to the clear brine there is added a solution of sodium carbonate or sodium bicarbonate, such as liquors discharging from the sodium bicarbonate decomposer of the ammonia-soda cycle. The solution is filtered. The filtrate containing sodium chloride may be returned to the brine supply of the ammonia-soda cycle or may be discarded. The filtered calcium carbonate is then washed free of chlorides, dried, and calcined, and continued in the cycle.

Calcium chloride brines, ordinarily waste, are thus employed in reclamation and are at the same time used as sources of lime prepared in conjunction with any of the intermediate compounds of carbonic acid bled from the ammonia-soda cycle. And in this manner, caustic soda can be considered a further product of the ammonia-soda process along with those already well-known products, sodium carbonate and sodium bicarbonate.

Other modes of applying the principle of the invention may be employed, change being made as regards the details described, provided the features stated in any of the following claims, or the equivalent of such, be employed.

We therefore particularly point out and distinctly claim as our invention:

1. In the operation of the ammonia-soda process wherein carbonic acid compounds are formed and lime is reacted with ammonium chloride solution for recovery of ammonia and leaving a calcium chloride solution, clarifying said calcium chloride solution, reacting such carbonic acid compound of the process with such calcium chloride solution to form calcium carbonate, calcining the latter, reacting the resultant compound in the presence of water with sodium carbonate, and then recovering pure sodium hydroxide from such reaction.

2. In the operation of the ammonia-soda process wherein carbonic acid compounds are formed and lime is reacted with ammonium chloride solution for recovery of ammonia and leaving a calcium chloride solution, clarifying said calcium chloride solution, reacting ammonium carbonate of the process with such calcium chloride solution to form calcium carbonate, calcining the latter, reacting the resultant compound in the presence of water with sodium carbonate, and then recovering pure sodium hydroxide for such reaction.

3. In the operation of the ammonia-soda process wherein carbonic acid compounds are formed and lime is reacted with ammonium chloride solution for recovery of ammonia and leaving a calcium chloride solution, reacting ammonium bicarbonate of the process with such calcium chloride solution to form calcium carbonate, calcining the latter, reacting the resultant compound in the presence of water with sodium carbonate, and then receiving pure sodium hydroxide from such reaction.

4. In the operation of the ammonia-soda process wherein carbonic acid compounds are formed and lime is reacted with ammonium chloride solution for recovery of ammonia and leaving a calcium chloride solution, clarifying said calcium chloride solution, reacting sodium carbonate of the process with such calcium chloride solution to form calcium carbonate, calcining the latter, reacting the resultant compound in the presence of water with sodium carbonate, and then recovering pure sodium hydroxide from such reaction.

5. In the operation of the ammonia-soda process wherein carbonic acid compounds are formed and lime is reacted with ammonium chloride solution for recovery of ammonia and leaving a calcium chloride solution, clarifying said calcium chloride solution, bleeding ammonium carbonate solution from the ammonia-soda cycle into reaction with such calcium chloride solution to form calcium carbonate, calcining the latter, reacting the resultant compound in the presence of water with sodium carbonate, and then recovering pure sodium hydroxide from such reaction.

6. In the operation of the ammonia-soda process wherein carbonic acid compounds are formed and lime is reacted with ammonium chloride solution for recovery of ammonia and leaving a calcium chloride solution, clarifying said calcium chloride solution, bleeding ammonium carbonate solution from the ammonia-soda cycle in excess into reaction with such calcium chloride solution to form calcium carbonate, calcining the latter, reacting the resultant compound in the presence of water with sodium carbonate, and then recovering pure sodium hydroxide from such reaction.

7. In the operation of the ammonia-soda process wherein carbonic acid compounds are formed and lime is reacted with ammonium chloride solution for recovery of ammonia and leaving a calcium chloride solution, clarifying said calcium chloride solution, bleeding a liquor from the sodium bicarbonate decomposition stage of the ammonia-soda cycle into reaction with such calcium chloride solution to form calcium carbonate, calcining the latter, reacting the resultant compound in the presence of water with sodium carbonate, and then recovering pure sodium hydroxide from such reaction.

8. In the operation of the ammonia-soda process wherein carbonic acid compounds are formed and lime is reacted with ammonium chloride solution for recovery of ammonia and leaving a calcium chloride solution, clarifying said calcium chloride solution, reacting such carbonic acid compound of the process with such calcium chloride solution to form calcium carbonate, calcining the latter, reacting the resultant compound in the presence of water with sodium carbonate to form sodium hydroxide and calcium carbonate, and then filtering, drying, and returning the last produced calcium carbonate to the cycle, and separating out the sodium hydroxide in pure form as the resultant product.

JOHN C. GARRELS.
HOWARD RODERICK.